Patented Jan. 30, 1923.

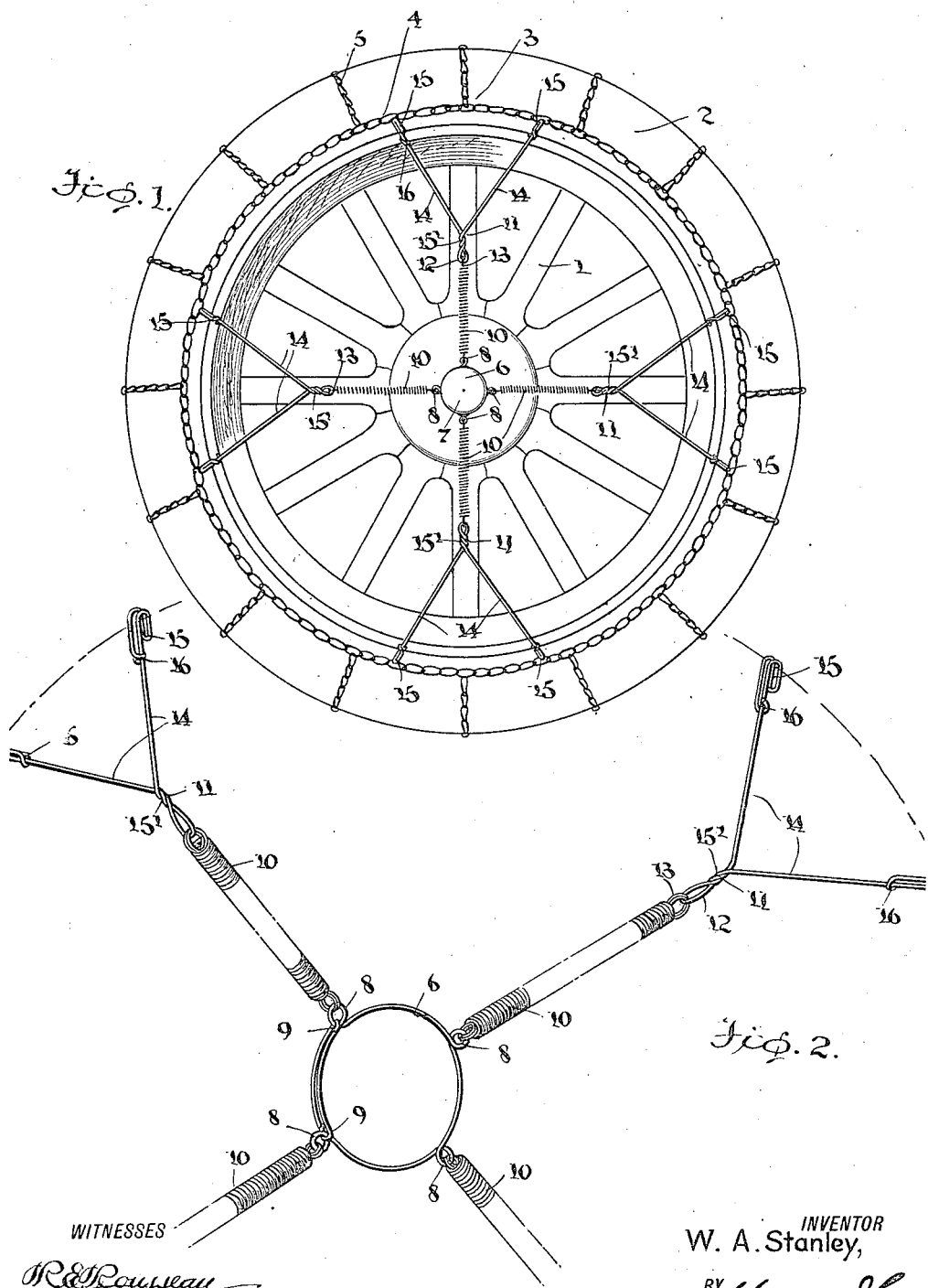

1,443,769

UNITED STATES PATENT OFFICE.

WILL ALLEN STANLEY, OF SPOKANE, WASHINGTON.

TIGHTENER FOR ANTISKID CHAINS.

Application filed March 24, 1922. Serial No. 546,358.

*To all whom it may concern:*

Be it known that I, WILL A. STANLEY, a citizen of the United States, and a resident of Spokane, in the county of Spokane and State of Washington, have invented certain new and useful Improvements in Tighteners for Antiskid Chains, of which the following is a specification.

My invention relates to tighteners for anti-skid chains, and it consists in the combinations, constructions and arrangements herein described and claimed.

An object of my invention is to provide a simple and effective device of the character described which is light in weight and adapted to be applied readily to an anti-skid chain mounted upon the pneumatic tire of an automobile wheel of ordinary construction.

A further object of my invention is to provide a tightener for anti-skid chains which has means for exerting balanced tensions upon an applied anti-skid chain at a plurality of spaced-apart points, whereby the device will be effective for the purpose intended even though certain of the chain-engaging elements thereof be disengaged from the chain.

Other objects and advantages will be apparent from the following description, and the novel features of the invention will be particularly outlined in the appended claim.

My invention is illustrated in the accompanying drawings, forming a part of this application, in which:—

Fig. 1 is a side elevation of an automobile wheel equipped with my invention, and Fig. 2 is a fragmentary enlarged view of the device detached from the wheel.

Referring now to the drawings and particularly Fig. 1, I show an automobile wheel 1 of conventional construction upon which is mounted a pneumatic tire 2 having an anti-skid chain 3 applied thereto. The anti-skid chain 3 is of ordinary construction and comprises the annular or ring members 4 disposed at the sides of the tire 2 and connected at intervals by transverse members 5 which span the tire.

The embodiment of the invention illustrated in the drawings comprises a central ring 6 mounted upon a hub or hub cap 7 of the wheel in encircling relation thereto. The ring 6 is made of a single piece of wire bent into a ring having a plurality of loops 8 spaced equi-distantly apart and extending radially of the ring substantially in the plane thereof. The piece of wire of which the ring 6 is formed is of such length that the end portions thereof extend in lapped or juxtaposed relation between adjacent loops 8 and are secured at their extremities to such adjacent loops, as indicated at 9—9. A retractile spring 10 of coiled formation is provided for each of the loops 8 and is attached at its inner end to the latter.

The spring members 10 carry connectors 11 at their outer ends which are adapted to be releasably attached to the side members 4 of the anti-skid chain 3 whereby the latter is placed under tension at spaced apart points and is thus maintained in applied position upon the tire 2. Each of the connectors 11 consists of a single piece of wire bent intermediately to provide a loop portion 12 adapted to be connected with its respective spring 10 through the agency of a loop 13 at the outer end of the latter and to provide divergent arm portions 14—14 which are merged into the loop portions by the twisted inner end portions thereof, as indicated at 15'. The arms 14—14 are bent to provide hooks 15—15 adjacent to their outer ends, the extreme end portions of the arms being bent backwardly to extend in contiguous relation to the straight portions of the arms for a distance and then being secured to the latter at 16, as by being twisted around the same. The loop portions 12 and the divergent arms 14—14 of each connector lie in substantially the same plane, while the hooks 15—15 extend laterally of that plane.

From the foregoing description of the various parts of the device, the operation thereof may be readily understood. In the embodiment of the invention illustrated, I have provided a central ring having four of the loops 8, which are therefore spaced ninety degrees apart. Obviously, I may provide a greater or less number of the loops 8, as desired. The springs 10 are placed under tension when the hooks 15 are attached to the side members of the anti-skid chain 3. In applying the device, the connectors 11 are spaced equi-distantly apart so that equal lengths of the side members 3 will extend between the adjacent hooks 15 of the several connectors. Since equal lengths or portions of the side members 3 are subtended by the pairs of divergent arms 14—14 of the several connectors, it will be manifest that the tension placed upon the anti-skid chain 3 is distributed uniformly along the side members 4 of the chain, whereby the chain will be effectively held in applied position upon the tire 2, irrespective of the condition of inflation of the latter. Moreover, another important advantage is gained on account of the tension on the anti-skid chain being uniformly distributed, in that the device as a whole will be effective even though certain of the hooks 15 should be disengaged from the side members 4 of the chain and the tension placed upon the chain through each of the connectors 11 tends to maintain every other connector in engagement with the chain.

I am aware that tension devices have been provided prior to my invention for holding anti-skid chains upon automobile wheels, but such devices, of which I am aware, do not fulfill the objects of my invention in that they do not impose a balanced tension upon the anti-skid chains in the same effective manner as my device, are not held in applied position in respect to an anti-skid chain in the same manner as my device, and are not capable of holding anti-skid chains in applied position upon the tire of a wheel when partially disengaged from the chain.

Obviously, my invention is susceptible of embodiment in forms other than that in which illustrated in the accompanying drawings, and I therefore consider as my own, all modifications and adaptations of the form of the device disclosed herein which fairly fall within the scope of the appended claim.

I claim:—

A tightening device for anti-skid chains comprising a member adapted to encircle the hub of a wheel, said member being formed of a single piece of wire bent substantially into ring shape with the end portions thereof extending beyond each other in overlapping relation, said piece of wire being bent at intervals to provide radially extending loops and each extremity of said piece of wire being engaged with the loop proximate thereto, and tension-occasioning means attached to said loops and being adapted at their outer ends for engagement with anti-skid chains.

WILL ALLEN STANLEY.